United States Patent
Sun et al.

(10) Patent No.: US 12,141,990 B2
(45) Date of Patent: Nov. 12, 2024

(54) IMAGE REGISTRATION

(71) Applicant: Shanghai United Imaging Intelligence Co., Ltd., Shanghai (CN)

(72) Inventors: Shanhui Sun, Lexington, MA (US);
Zhang Chen, Brookline, MA (US);
Xiao Chen, Lexington, MA (US);
Terrence Chen, Lexington, MA (US);
Junshen Xu, Cambridge, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 506 days.

(21) Appl. No.: 17/475,534

(22) Filed: Sep. 15, 2021

(65) Prior Publication Data
US 2023/0079164 A1    Mar. 16, 2023

(51) Int. Cl.
*G06T 7/30*     (2017.01)
*G06N 3/02*     (2006.01)

(52) U.S. Cl.
CPC ............. *G06T 7/30* (2017.01); *G06N 3/02* (2013.01); *G06T 2207/10081* (2013.01);
(Continued)

(58) Field of Classification Search
CPC ............ G06T 7/30; G06T 2207/10081; G06T 2207/10088; G06T 2207/20081;
(Continued)

(56) References Cited

U.S. PATENT DOCUMENTS

9,710,910 B2    7/2017    Kim et al.
9,922,272 B2    3/2018    Cheng et al.
(Continued)

FOREIGN PATENT DOCUMENTS

CN    106909778 A    6/2017
CN    107798697 A    3/2018
WO    2020125221 A1    6/2020

OTHER PUBLICATIONS

Avants, Brian B., et al. Symmetric diffeomorphic image registration with cross-correlation: evaluating automated labeling of elderly and neurodegenerative brain, Feb. 2008.
(Continued)

*Primary Examiner* — Marcos L Torres
(74) *Attorney, Agent, or Firm* — Zhong Law, LLC

(57) ABSTRACT

Deep learning based systems, methods, and instrumentalities are described herein for registering images from a same imaging modality and different imaging modalities. Transformation parameters associated with the image registration task are determined using a neural ordinary differential equation (ODE) network that comprises multiple layers, each configured to determine a respective gradient update for the transformation parameters based on a current state of the transformation parameters received by the layer. The gradient updates determined by the multiple ODE layers are then integrated and applied to initial values of the transformation parameters to obtain final parameters for completing the image registration task. The operations of the ODE network may be facilitated by a feature extraction network pre-trained to determine content features shared by the input images. The input images may be resampled into different scales, which are then processed by the ODE network iteratively to improve the efficiency of the ODE operations.

18 Claims, 12 Drawing Sheets

(52) U.S. Cl.
CPC .............. *G06T 2207/10088* (2013.01); *G06T 2207/20081* (2013.01); *G06T 2207/20084* (2013.01); *G06T 2207/30004* (2013.01)

(58) Field of Classification Search
CPC . G06T 2207/20084; G06T 2207/20016; G06T 7/33; G06T 7/0012; G06T 2207/10072; G06T 2207/30004; G06N 3/02; G06N 3/0455; G06N 3/0464; G06N 3/0475; G06N 3/084; G06N 3/088
See application file for complete search history.

(56) References Cited

U.S. PATENT DOCUMENTS

| | | | |
|---|---|---|---|
| 10,235,606 B2 | 3/2019 | Miao et al. | |
| 10,636,141 B2 | 4/2020 | Zhou et al. | |
| 11,557,036 B2 | 1/2023 | Liao et al. | |
| 2017/0024634 A1* | 1/2017 | Miao | G06T 7/33 |
| 2020/0134918 A1* | 4/2020 | Wang | G06T 15/08 |
| 2021/0224634 A1* | 7/2021 | Chen | G01R 33/56545 |
| 2023/0238078 A1* | 7/2023 | Gonzalez Lozano | G06T 7/0012 382/128 |

OTHER PUBLICATIONS

Beg, M. Faisal, et al. Computing large deformation metric mappings via geodesic flows of diffeomorphisms, Sep. 2003.
Balakrishnan, Guha, et al. Voxelmorph: a learning framework for deformable medical image registration, Jan. 2019.
Ronneberger et al., U-net: Convolutional networks for biomedical image segmentation, May 2015.
Qin, Chen, et al., Unsupervised deformable registration for multi-modal images via disentangled representations, Mar. 2019.
Chen, Ricky TQ, et al., Neural ordinary differential equations. Advances in neural information processing systems, Jun. 2018.
Lee, Hsin-Ying, et al., Drit++: Diverse image-to-image translation via disentangled representations, May 2019.

* cited by examiner

IMAGE REGISTRATION

BACKGROUND

Image registration plays an important role in medical imaging applications. With image registration, medical images taken at different times, from different angles, and/or across multiple imaging modalities may be spatially aligned to facilitate diagnostic analysis, treatment planning, radiation therapies, etc. Conventional image registration methods formulate the problem as an optimization problem, where transformation parameters for registering a first image (e.g., a moving image) with a second image (e.g., a fixed image) are solved by minimizing dissimilarities between the two images. These conventional methods are iterative in nature and may require online optimization. As a result, they can be time-consuming and computationally expensive. In contrast, deep learning based image registration systems may be inherently faster since they may acquire the ability to register images through offline learning using large datasets, and once brought online, they may complete an image registration task in just one forward pass. Accordingly, it is highly desirable to utilize deep learning based techniques for image registration to achieve improved adaptability, continuous time-series modeling, increased memory and parameter efficiency, etc.

SUMMARY

Described herein are systems, methods, and instrumentalities associated with registering a first image and a second image of an anatomical structure. The registration may be performed using an artificial neural network (ANN) such as a neural ordinary differential equation (ODE) network and based on a plurality of transformation parameters determined by the ANN. Such an ANN may be configured to receive initial values of the transformation parameters and determine, through one or more iterations, respective updates (e.g., gradient updates) for the transformation parameters based on at least a respective present state (e.g., hidden state) of the plurality of transformation parameters associated with each of the one or more iterations. Final values of the transformation parameters may then be obtained based on the respective updates and used to register the first image with the second image. The final values of the transformation parameters may be derived, for example, utilizing an ordinary differential equation (ODE) solver.

In examples, the ANN described herein may include a neural ODE network trained using an adjoint sensitivity based method and the final values of the transformation parameters may be obtained by integrating the respective updates determined by the ANN via the ODE solver. In some examples, the first and second images being registered may be associated with a same imaging modality while in other examples the first and second images may be associated with different imaging modalities such as magnetic resonance imaging (MRI) and computed tomography (CT). In examples, the ANN may further include a generative adversarial network (GAN) pre-trained to extract features shared by the first image and the second image (e.g., when the images are captured by different imaging modalities) such that the images may be registered based on the shared features (e.g., the extracted features may be used to determine similarity metrics that may facilitate the performance of the image registration task).

In examples, the ANN may include at least a first sub-network (e.g., a first neural ODE network) and a second sub-network (e.g., a second neural ODE network). The first sub-network may be configured to determine a first set of transformation parameters for registering the first image with the second image based on respective versions of the first image and the second image having a first scale (e.g., a first resolution), and the second sub-network may be configured to determine a second set of transformation parameters for registering the first image with the second image based on the first set of transformation parameters and respective versions of the first image and the second image having a second scale (e.g., a second resolution). The first and second sub-networks may be characterized by different transformation (e.g., optimization) step sizes and/or different error tolerance levels, which may allow the ANN to accomplish the image registration task with a reduced number of evaluations and/or a smaller searching space for parameters.

In examples, the plurality of transformation parameters determined by the ANN may comprise deformable transformation parameters, and the ANN may include a first neural ODE sub-network and a second neural ODE sub-network that is cascaded with the first ODE sub-network. The first neural ODE sub-network may be configured to determine a set of rigid transformation parameters for registering the first image with the second image, and the second neural ODE sub-network may be configured to determine the deformable transformation parameters based on the set of rigid transformation parameters determined by the first neural ODE sub-network. In examples, the deformable transformation parameters may be determined without first determining the rigid (or affine) transformation parameters (e.g., without using a cascading network structure).

BRIEF DESCRIPTION OF THE DRAWINGS

A more detailed understanding of the examples disclosed herein may be obtained from the following description, given by way of example in conjunction with the accompanying drawing.

DETAILED DESCRIPTION

The present disclosure is illustrated by way of example, and not by way of limitation, in the figures of the accompanying drawings.

Figure 1:
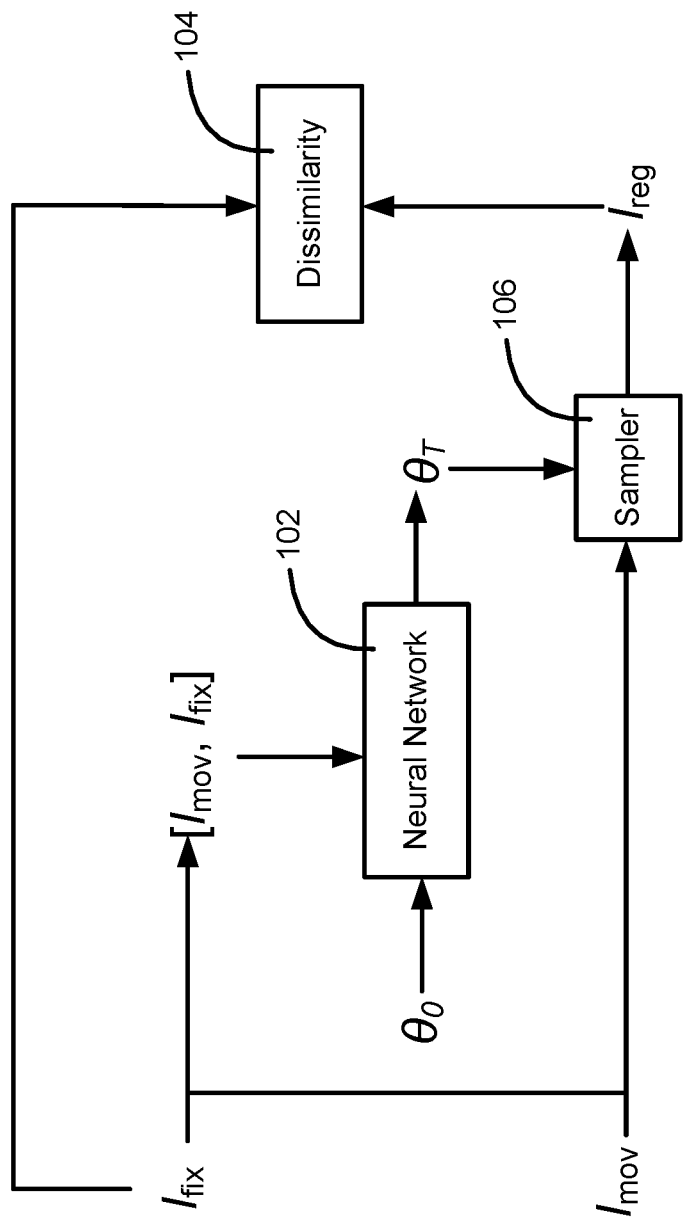
FIG. 1 is a block diagram illustrating an example of image registration using an artificial neural network in accordance with one or more embodiments described herein.

FIG. 1 is a diagram illustrating an example of registering two images, $I_{mov}$ (e.g., a source image) and $I_{fix}$ (e.g., a target image), using an artificial neural network (ANN) 102. The images $I_{fix}$ and $I_{mov}$ may be two-dimensional (2D) or three-dimensional (3D) medical images of an anatomical structure (e.g., the human heart or brain) obtained from one or more imaging modalities. For example, the images $I_{fix}$ and $I_{mov}$ may be images captured using a same imaging modality such as a magnetic resonance imaging (MRI) scanner, a X-ray machine, a computed tomography (CT) scanner, etc., at different times. The images $I_{fix}$ and $I_{mov}$ may also be images captured using different imaging modalities (e.g., at the same time or at different times). For example, the image $I_{fix}$ may be an MRI image (e.g., including a cine movie) and the image $I_{mov}$ may be a CT image, or vice versa.

The neural network 102 may be configured to receive the images $I_{fix}$ and $I_{mov}$ (e.g., as inputs), transform the image $I_{mov}$ from a moving image domain (e.g., associated with the image $I_{mov}$) to a fixed image domain (e.g., associated with the image $I_{fix}$), and generate an image $I_{reg}$ (e.g., as a spatial transformed version of the image $I_{mov}$) that resembles the image $I_{fix}$ (e.g., with a minimized dissimilarity 104 between $I_{fix}$ and $I_{reg}$). The neural network 102 may be trained to determine a plurality of transformation parameters $\theta_T$ for transforming the image $I_{mov}$ into the image $I_{reg}$. This operation may be illustrated by the following:

$$I_{reg} = I_{mov}(\theta(x)) \quad (1)$$

where x may represent coordinates in the moving image domain, $\theta(x)$ may represent the mapping of x to the fixed image domain, and $I_{mov}(\theta(x))$ may represent one or more grid sampling operations (e.g., using a sampler 106). θ may include parameters associated with an affine transformation model, which may allow for translation, rotation, scaling, and/or skew of the input image. θ may also include parameters associated with a deformable field (e.g., a dense deformation field), which may allow for deformation of the input image. For example, θ may include rigid parameters, B-spline control points, deformable parameters, and/or the like.

The neural network 102 may be configured to determine values $\theta_T$ of the transformation parameters based on a set of initial values $\theta_0$ of the transformation parameters and an integral of updates (e.g., gradient updates) to the transformation parameters determined by the neural network 102. In examples, the initial values $\theta_0$ of the transformation parameters may be obtained (e.g., randomly) from a normal distribution, based on an existing image registration model, etc. In examples, the neural network 102 may include a neural ordinary differential equation (ODE) network configured to determine the transformation parameters $\theta_T$ by solving an ordinary differential equation associated with the transformation parameters. Such a neural ODE network may include one or more ODE layers or ODE blocks, each of which may be configured to determine (e.g., predict or estimate) a respective update (e.g., gradient update) to the transformation parameters based on a present or current state (e.g., current values) of the transformation parameters. For example, the neural network 102 may be configured to determine respective updates to the transformation parameters through one or more iterations (e.g., through the one or more ODE layers or blocks) and each of the updates may be determined based on the present state of the transformation parameters associated with each of the one or more iterations. The updates may then be used to obtain (e.g., derive) final values $\theta_T$ of the transformation parameters utilizing an ODE solver. For instance, the ODE solver may be used to integrate the respective updates (e.g., gradient updates) determined (e.g., predicted) by the one or more ODE layers or blocks, and apply the integral of the updates to the initial parameter values $\theta_0$ to derive the final values $\theta_T$.

The operation of the neural ODE network described above may be illustrated by the following. Formulating the image registration task as $$\theta_{opt} = \arg\min_{\theta} C(\theta; I_{fix}, I_{mov}),$$

where θ may represent the transformation parameters described herein and C may represent a loss (or cost) function designed to indicate the dissimilarity 104 between $I_{fix}$ and $I_{mov}$ (θ(x)), the transformation parameters θ may be derived utilizing a gradient descent-based optimization technique, such as the one illustrated below:

$$\theta_{t+1} = \theta_t - \eta_t(\partial C/\partial \theta) \quad (2)$$

where t may represent an iteration in the optimization process, $\eta_t$ may represent an optimization step size, and $\partial C/\partial \theta$ may represent a derivative of the loss function C at a current or present state $\theta_t$ (e.g., representing current values) of the transformation parameters.

The neural ODE network may be trained to predict an update (e.g., a gradient update) corresponding to $\eta_t(\partial C/\partial \theta)$ shown in Equation (2), and the update predicted by such a network may be represented as:

$$\theta_{t+1} = \theta_t + f(\theta_t, \mu_t) \quad (3)$$

where f may represent the neural ODE network parameterized with $\mu_t$. With a sufficiently small t, the updates may occur in a continuous manner (e.g., a substantially continuous manner), as represented by the following ordinary differential equation:

$$\frac{d\theta(t)}{dt} = f_\mu(\theta(t), t) \quad (4)$$

where $f_\mu$ may represent the neural ODE network parameterized with μ.

Hence, starting from the initial parameter values $\theta_0$, the neural ODE network may be trained to produce, e.g., utilizing an ODE solver, an output $\theta_T$ (e.g., final values of the transformation parameters) that corresponds to a solution to the ordinary differential equation shown in (4) (e.g., the function of the ODE network may be understood as solving an initial value problem during a time period of [0, T]). When the inputs to the neural ODE network include images such as images $I_{fix}$ and $I_{mov}$ shown in FIG. 1, a gradient update predicted by the neural ODE network (e.g., by a layer of the ODE network) may be represented as:

$$\frac{d\theta(t)}{dt} = f_\mu(I_{mov}(\theta_t(x)), I_{fix}, t) \quad (5)$$

and a solution to the ordinary differential equation may be:

$$\theta_T = \theta_{t0} + \int_{t0}^{T} f_\mu(I_{mov}(\theta_t(\theta_t(x))), I_{fix}, t) * dt \quad (6)$$

and $$\theta_{t+dt} = \theta_t + f_\mu(I_{mov}(\theta_t(x)), I_{fix}, t) * dt \quad (7)$$

where (6) may represent continuous derivation of the parameters at T and (7) may represent a step (e.g., from t to t+dt) in the derivation process.

Once the values of the transformation parameters $\theta_T$ are obtained, they may be used to transform the input image $I_{mov}$ to $I_{reg}$, for example, via one or more resampling operations that may be performed using the sampler 106. During training of the neural ODE network, the image $I_{reg}$ may be compared to the input image $I_{fix}$ and the dissimilarity 104 between the two images may be determined based on a loss function (e.g., a loss function based on an Euclidean distance, a cross correlation, a normalized cross correlation, etc.). The dissimilarity 104 may then be used to guide the adjustment of the network parameters, for example, with an objective to minimize the dissimilarity 104.

Figure 2:
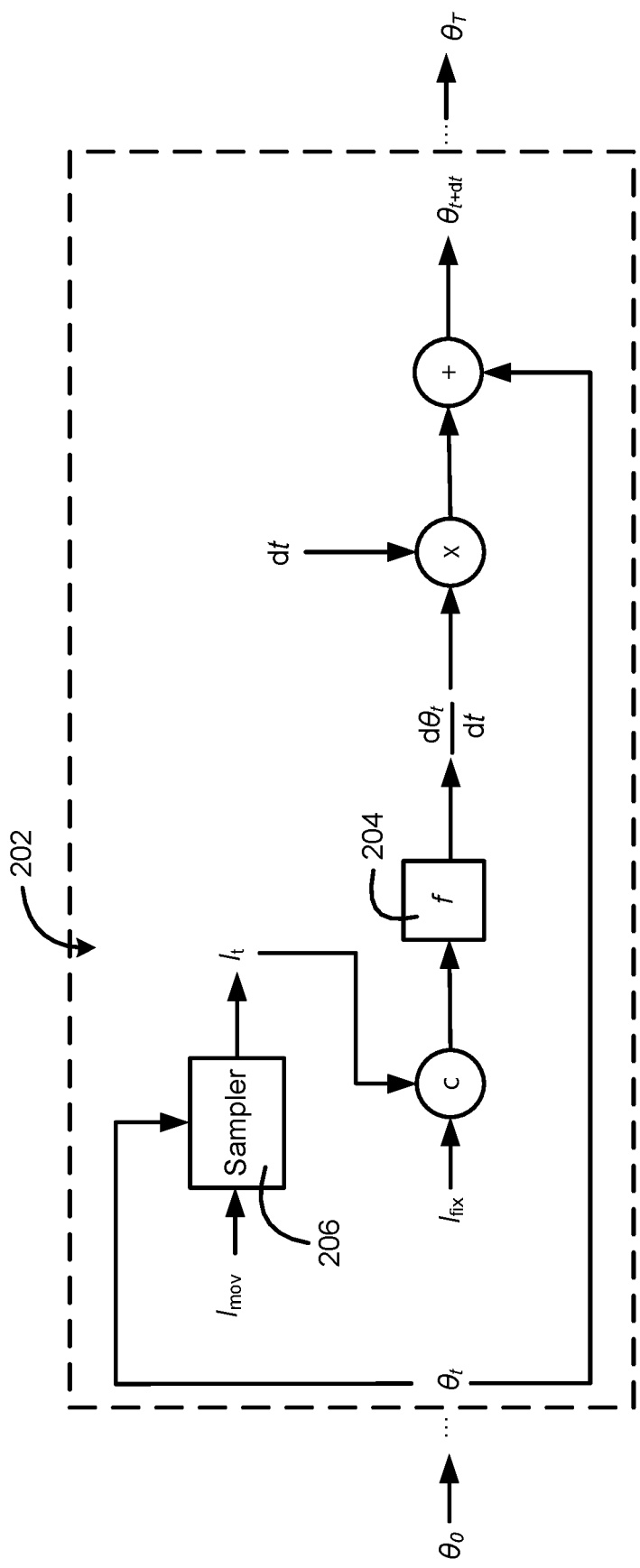
FIG. 2 is a block diagram illustrating example operations of a neural ordinary differential equation (ODE) network in accordance with one or more embodiments described herein.

FIG. 2 is a diagram illustrating example operations of the neural ODE network described herein (e.g., the neural network 102 shown in FIG. 1). The example operations may be associated with one step 202 (e.g., an iteration from t to t+dt) of a process executed by a neural ODE network 204 to derive transformation parameters θ for registering two images $I_{mov}$ and $I_{fix}$. As illustrated, the operations at step 202 may include transforming an input image $I_{mov}$ into an image $I_t$ based on present values $\theta_t$ of the transformation parameters θ at the beginning of the step. The transformation may be performed, for example, by resampling the input image $I_{mov}$ based on the transformation parameters $\theta_t$ using a sampler 206. The operations at step 202 may further include concatenating (e.g., combining) the images $I_t$ and $I_{fix}$ and providing the concatenated image to the neural ODE network 204 to obtain (e.g., predict) a gradient update, $$\frac{d\theta_t}{dt},$$

for the transformation parameters θ. Such a gradient update may be obtained by considering the current state $\theta_t$ of the transformation parameters, and the gradient update thus obtained may be evaluated by an ODE solver (e.g., a Runge-Kutta solver), the detail of which will be further described below. The gradient update may be integrated with a step size (e.g., an optimization step size) dt to obtain updated parameter values $\theta_{t+dt}$, and similar operations may be performed by the neural ODE network 204 in one or more additional steps or iterations (e.g., via respective ODE blocks or layers) to derive a solution $\theta_T$ to the ordinary differential equation, e.g., as illustrated by Equations (4)-(7).

The neural ODE network described herein (e.g., neural network 102 of FIG. 1 and/or the neural network 204 of FIG. 2) may be designed with different structures (e.g., depth of layers, types of layers, etc.) depending on the specific problem being solved. For example, to derive rigid transformation parameters (e.g., which may be associated with 3D rigid motions), the neural ODE network may include one or more convolution layers followed by one or more fully connected layers. Such an ODE network may be referred to herein as a rigid ODE network. As another example, to derive transformation parameters associated with deformable motions, the neural ODE network may include a fully convolutional network, and such an ODE network may be referred to herein as a deformable ODE network. For hybrid motions (e.g., rigid and deformable motions), the neural ODE network may include a rigid ODE network and a deformable ODE network, which may be cascaded together (e.g., sequentially).

Figure 3:
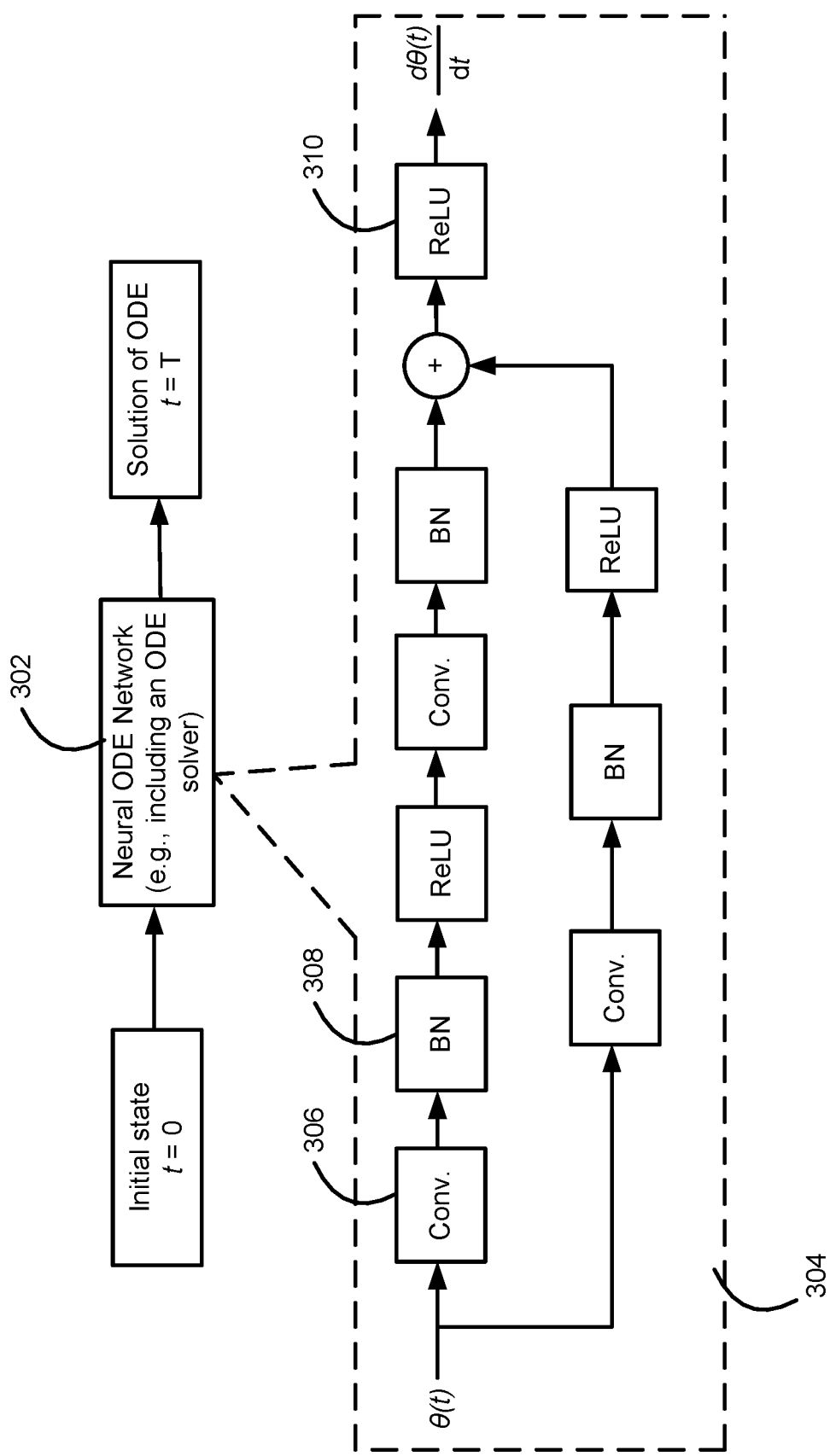
FIG. 3 is a block diagram illustrating an example structure of a neural ODE network in accordance with one or more embodiments described herein.

FIG. 3 shows an example structure of a neural ODE network 302 (e.g., the neural network 102 of FIG. 1 and/or the neural network 204 of FIG. 2) that may be configured to determine image registration parameters (e.g., transformation parameters) for registering a first image of an anatomical structure with a second image of the anatomical structure. The figure shows one ODE layer or block 304 associated with one hidden state θ(t) of the transformation parameters, but a skilled person in the art will appreciate that the neural ODE network 302 may include multiple such layers or blocks and that the transformation parameters may adjusted through a series of transformations involving multiple hidden states. As shown in FIG. 3, the ODE layer or block 304 may include one or more convolutional layers 306, one or more batch normalization (BN) layers 308, one or more activation functions 310 (e.g., rectified linear unit (ReLU) activation functions), one or more pooling layers (not shown), and/or one or more fully connected layers (not shown). Each of the convolutional layers 306 may include a plurality of convolution kernels or filters (e.g., having a kernel size of 9×1 or 1×1) with respective weights configured to extract features from the image(s) received by the neural ODE network 302 (e.g., the source image $I_{mov}$ and/or target image $I_{fix}$ described herein). The operations of the convolutional layers 306 may be followed by batch normalization (e.g., via the BN layer 308) and/or linear or non-linear activation (e.g., using the ReLU 310), and the features extracted by the convolutional layers 306 may be down-sampled through a contraction path (e.g., comprising one or more pooling layers and/or one or more fully connected layers) to reduce the redundancy and/or dimension of the extracted features. In some examples, the down-sampled features may be subsequently processed through an expansive path (e.g., comprising one or more transposed convolutional layers and/or one or more un-pooling layers) during which the features may be up-sampled to a higher resolution.

The features extracted by the convolution operations described herein may be used by the neural ODE network 302 to determine transformation parameters for spatially aligning the images of interest. The neural ODE network 302 may predict the transformation parameters, for example, by continuously transforming the hidden state θ(t) of the parameters through one or more of the ODE layer or block 304. Each transformation may correspond to transforming the hidden state of the parameters from θ(t) to θ(t+Δt), where Δt may represent a transformation or optimization step or size. As Δt approaches zero (e.g., when the transformation step is sufficiently small), a final state of the transformation parameters (e.g., θ(t=T)) may be obtained by solving an ODE associated with the transformation parameters (e.g., as illustrated by Equations 4-7). The amount of transformation (e.g., adjustment), $$\frac{d\theta(t)}{dt},$$

determined and/or applied by the ODE block 304 may be evaluated using an ODE solver (e.g., as illustrated by Equation(s) 6 and/or 7 described herein) and the error tolerance level of the ODE solver may determine the number of transformations and/or evaluations to be performed before final values of the transformation parameters are obtained. The ODE solver may be implemented using various numerical analysis techniques. For example, the ODE solver may include an Euler solver (e.g., based on the Euler method for solving an ODE), a Runge-Kutta (RK) solver such as an RK2 or RK4 solver (e.g., based on a Runge-Kutta (RK) method for solving an ODE), an adaptive step size solver (e.g., based on an adaptive step size method for solving an ODE), etc. The ODE solver may be a stand-alone solver (e.g., separated from the neural ODE network 302) or may be part of the neural ODE network 302 (e.g., the ODE solver itself may be learned through training). The error tolerance level of the ODE solver may be configurable (e.g., as a hyper-parameter of the neural ODE network 302) and may be assigned a same value or different values for training and inference purposes.

Figure 4:
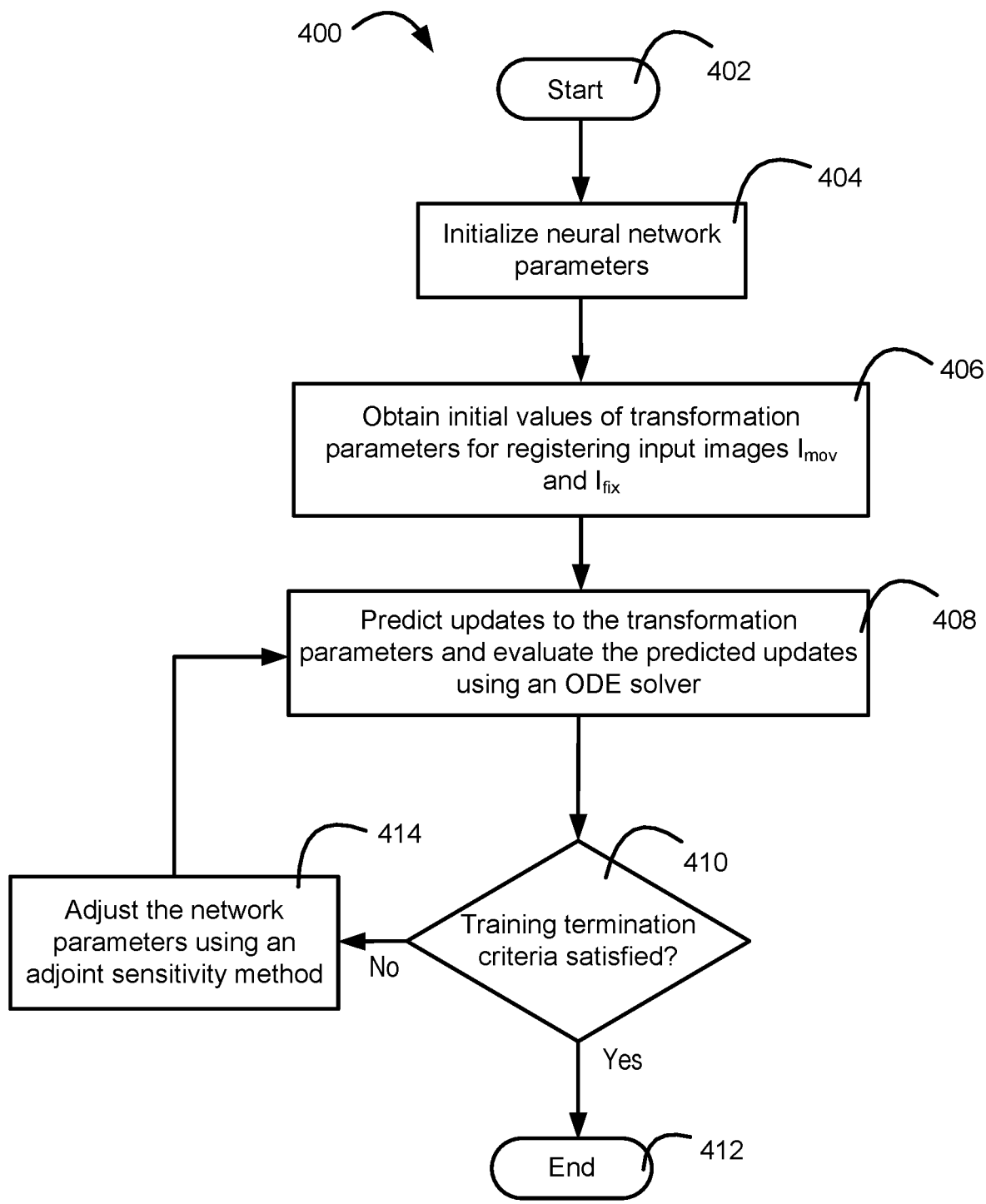
FIG. 4 is a flow diagram illustrating an example process for training a neural ODE network in accordance with one or more embodiments described herein.

Accordingly, using the example structure shown in FIG. 3, the continuous dynamics (e.g., updates or adjustments) associated with the transformation parameters may be learned by the neural ODE network 302 through training. FIG. 4 illustrates an example process 400 for training the neural ODE network described herein. The process 400 may start at 402 and initial parameters of the neural network (e.g., weights associated with various filters or kernels of the neural network) may be set at 404. The initial network parameters may be derived, for example, based on samples from one or more probability distributions or parameter values of another neural network having a similar architecture. At 406, the neural ODE network may obtain (e.g., be provided with) a first input training image $I_{mov}$, a second input training image $I_{fix}$, and an initial set of transformation parameters $\theta_0$ for registering the first training image $I_{mov}$ with the second training image $I_{fix}$. At 408, the neural ODE network may predict respective updates (e.g., gradient updates $\underline{d}\theta(t)/\underline{d}t$) to the transformation parameters corresponding to one or more hidden states $\theta_t$ of the transformation parameters (e.g., t=1 . . . T), and may evaluate the prediction results using an ODE solver (e.g., an RK2 or RK4 ODE solver as described herein). The updates may be predicted, for example, based on features extracted from the input images $I_{mov}$ and $I_{fix}$, and/or the hidden states $\theta_t$ of the transformation parameters. The predicted updates may be integrated using the ODE solver and the integral may be used to obtain a warped image (e.g., $I_{reg}$) that may then be compared to the input image $I_{fix}$ to determine the validity of the prediction made by the neural network.

At 410, the neural ODE network may determine whether one or more training termination criteria are satisfied. For example, the neural network may determine that the training termination criteria are satisfied if the neural network has completed a pre-determined number of training iterations, if the difference between the prediction results and a desired outcome is below a predetermined threshold, etc. If the determination at 410 is that the training termination criteria are satisfied, the neural ODE network may end the training process 400 at 412. Otherwise, the neural ODE network may at 414 adjust the neural network parameters with an objective to minimize the difference between the warped image $I_{reg}$ and the input image $I_{fix}$ (e.g., based on any differentiable loss function such as an L2 loss function). The adjustment may be made, for example, using an adjoint sensitivity method during which the gradients of the loss function may be computed by solving a second (e.g., augmented) ODE backwards in time. For instance, denoting the loss function as L, a gradient $dL/d\theta_t$ of the loss function associated with a hidden state $\theta_t$ (e.g., t=1 . . . N) may be expressed as $a(t)=dL/d\theta_t$ (e.g., representing an adjoint). The dynamics of the adjoint a(t) (e.g., representing the gradients of the loss function) may be given by another ODE, which may be solved by calling a second ODE solver. This second ODE solver may run backwards, starting from an initial value of $dL/d\theta_N$ and recomputing the hidden state $\theta_t$ backwards in time together with the adjoint (e.g., using the final hidden state $\theta_N$). Thus, using such an adjoint method, backpropagation through the ODE solver may not be needed, and since the accuracy of the prediction made by the neural ODE network may be controlled by the number of evaluations performed (e.g., in accordance with the error tolerance level of the ODE solver), memory and/or parameter efficiency may be accomplished using the neural ODE network described herein (e.g., the neural ODE model may be very deep without incurring significant memory and/or parameter overheads).

In examples (e.g., to register images produced by different imaging modalities), the image registration operations described herein may be facilitated by a neural network pre-trained to extract features from the input images such that modality-independent metrics may be learned (e.g., based on the extracted features) to facilitate the registration operations. Such a feature extraction neural network may be trained to extract at least two types of features: style features that may reflect global contrasts of the images, and content features that may represent structural information of the anatomical structure depicted in the images. The style features may be modality specific (e.g., MR and CT images of a same anatomical structure may have different style features) while the content features may be modality-independent (e.g., shared by the images even if they are produced by different imaging modalities such as MRI and CT). In examples, the feature extraction neural network may additionally include a generator neural network trained to reconstruct an image based on extracted content and/or style features.

Figure 5:
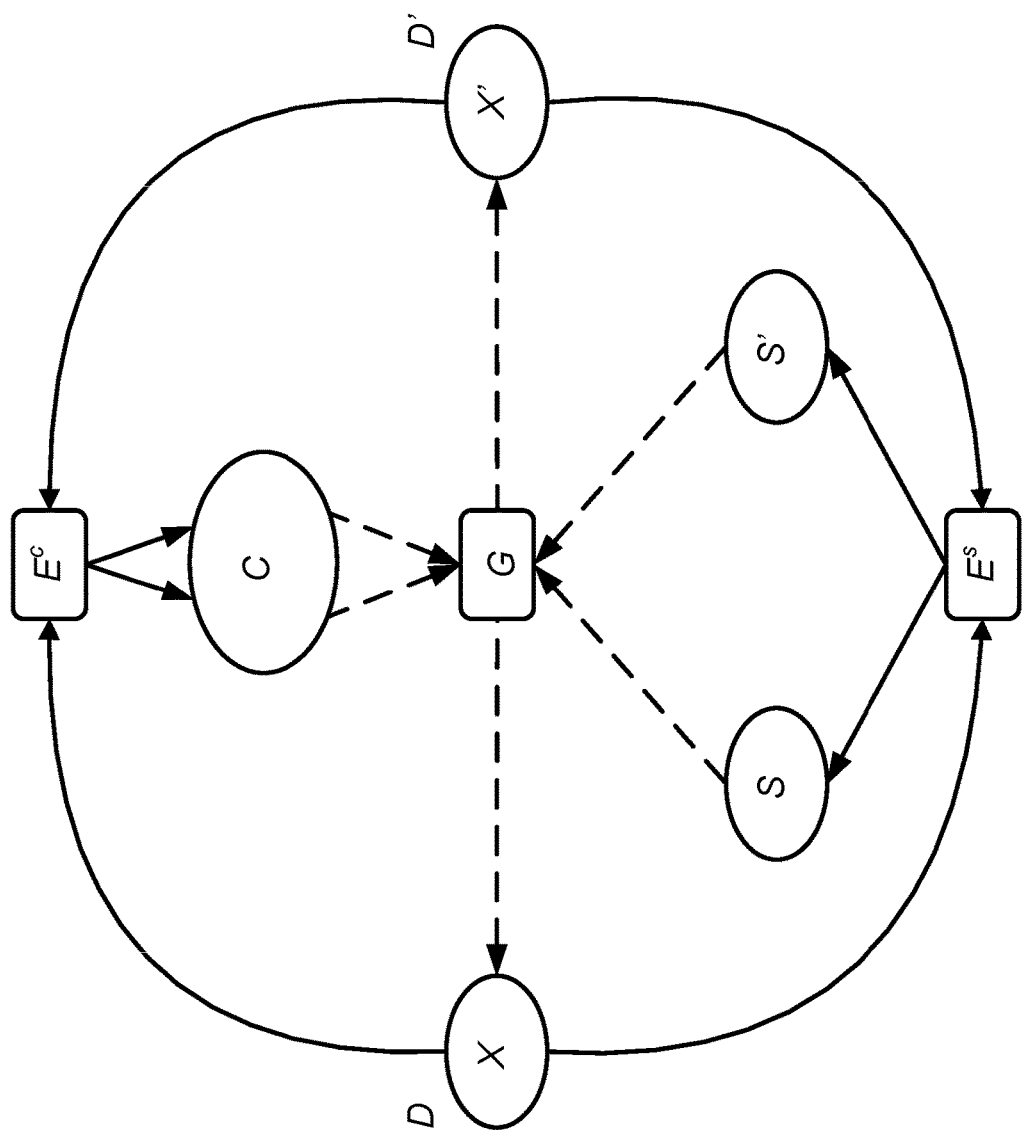
FIG. 5 is a diagram illustrating an example of multi-modal image feature extraction in accordance with one or more embodiments described herein.

FIG. 5 shows an example of multi-modal image feature extraction (e.g., image translation) using the techniques described above. As shown, X and X' may represent two images of an anatomical structure captured by different imaging modalities D and D' (e.g., MRI and CT) with corresponding modality domains. A content feature encoder $E^c$ (e.g., which may be a part of a GAN network) may be trained to extract, from the input images, content features C that are shared by the images. A style feature encoder $E^s$ (e.g., which may be a part of the same GAN network) may be trained to extract, from the input images, respective style features S and S' of the images. The extracted content and style features may then be used by an image generation network G to reconstruct an image that corresponds to the input image X or X' (e.g., the output image may be a translated version of the input image).

Figure 6:
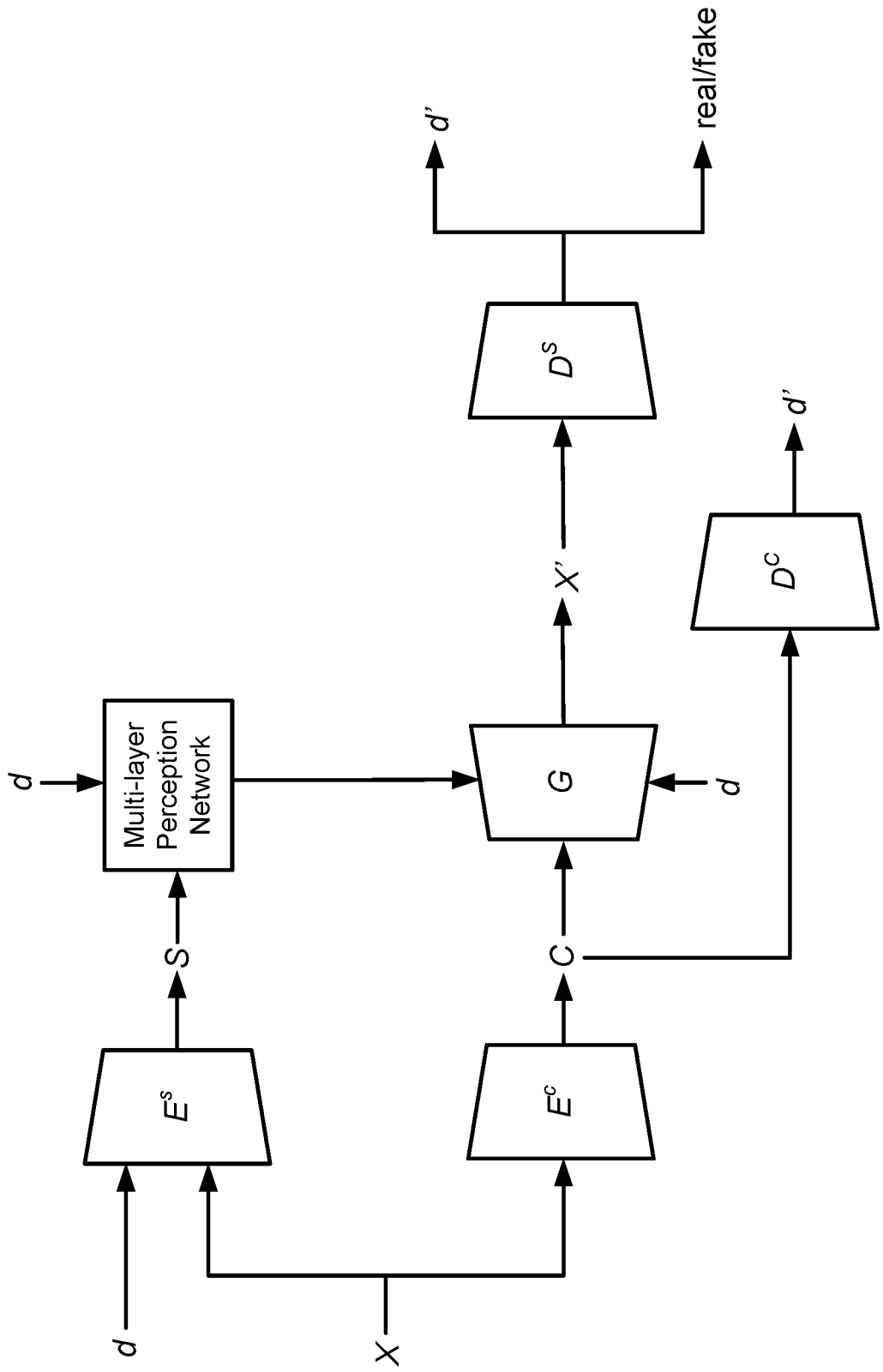
FIG. 6 is a block diagram illustrating an example of a neural network that may be used to extract content and/or style features from an image in accordance with one or more embodiments described herein.

FIG. 6 shows an example structure of a GAN that may be used to perform the feature extraction operations described herein and example ways for training the GAN. As shown, the GAN may include a content feature encoder $E^c$ and a style feature encoder $E^s$. The content feature encoder $E^c$ may be a fully convolutional network pre-trained to extract content features C from an input image X while the style feature encoder $E^s$ may include one or more convolution layers, one or more pooling layers (e.g., a global average pooling layer), and/or a fully connected layer pre-trained to extract style features (e.g., global style features) from the input image X. A modality code may be converted into a one-hot vector, d, concatenated with an input tensor along a channel dimension. The GAN may further include a decoder that uses a multilayer perception (MLP) network to produce a set of adaptive instance normalization (AdaIN) parameters from the encoded style features, and up-samples the encoded content/style features to a higher resolution, for example, using one or more transposed convolution layers and/or un-pooling layers. The GAN may also include a generator network G that may be pre-trained to receive the extracted content features C and style features S, and reconstruct an image X' based on those features. The generator G may include one or more deconvolution layers (e.g., transposed convolution layers) configured to output the image X' at the same resolution (or size) as the input image X. The training of the GAN may be conducted in an unsupervised manner, during which the generator G may be trained to force discriminator networks $D^S$ and $D^C$ to distinguish generated samples (e.g., labeled as "fake") from real samples (e.g., labelled as "real").

Figure 7A:
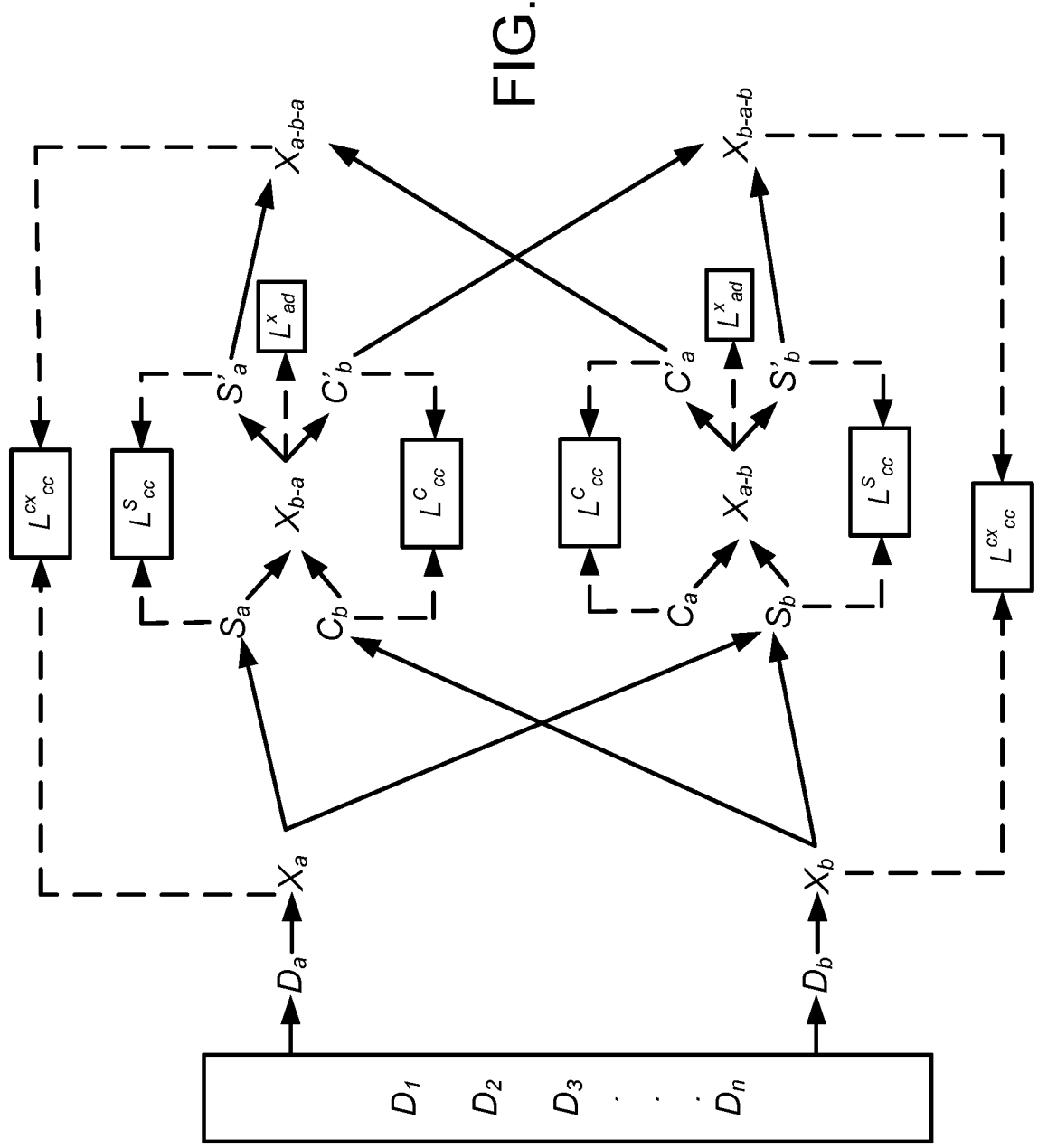
FIG. 7A is a diagram illustrating an example technique for training a neural network for extracting content and/or style features from images associated with multiple modality domains in accordance with one or more embodiments described herein.

FIG. 7A illustrates an example technique for training a GAN for extracting content and/or style features from images associated with n (e.g., n>=2) modality domains. During one or more training iterations, two sample images $X_a$ and $X_b$ may be selected from different domains (e.g., $D_a$ and $D_b$, respectively) and provided to the GAN. In response, the GAN may, using a content feature encoder (e.g., $E^c$ shown in FIG. 5 or FIG. 6) and a style feature encoder (e.g., $E^s$ shown in FIG. 5 or FIG. 6) described herein, extract respective style features $S_a$, $S_b$ and content features $C_a$, $C_b$ from the sample images $X_a$ and $X_b$. Utilizing the extracted content features $C_b$ and style features $S_a$, the GAN may, through a generator network described herein (e.g., the generator network G shown in FIG. 5 or FIG. 6), produce (e.g., reconstruct) an image $X_{b-a}$ that may represent the input image $X_b$ being translated into domain $D_a$. Similarly, the GAN may utilize extracted content features $C_a$ and style features $S_b$ to produce an image $X_{a-b}$ that may represent the input image $X_a$ being translated into domain $D_b$. The GAN may then decompose the image $X_{b-a}$ (e.g., using the feature encoders described herein) to obtain style features $S'_a$ and content features $C'_b$ such that a style consistency loss $L^S_{cc}$ between the style features $S'_a$ and $S_a$, and a content consistency loss $L^C_{cc}$ between the content features $C_b$ and $C'_b$ may be used to force the GAN to adapt its parameters (e.g., with an objective of minimizing these losses). In similar manners, the GAN may decompose the image $X_{a-b}$ to obtain style features $S'_b$ and content features $C'_a$ such that a style consistency loss $L^S_{cc}$ between the style features $S'_b$ and $S_b$, and a content consistency loss $L^C_{cc}$ between the content features $C_a$ and $C'_a$ may be used to force the GAN to further adapt its parameters (e.g., with an objective of minimizing these losses).

The GAN may additionally reconstruct an image $X_{a-b-a}$ that may represent the image $X_a$ being translated into domain $D_b$ and then back into domain $D_a$. A reconstruction consistency loss $L^{CX}_{cc}$ between the image $X_a$ and the reconstructed image $X_{a-b-a}$ may then be used to further optimize the operation of the GAN. The GAN may also reconstruct an image $X_{b-a-b}$ that may represent the image $X_b$ being translated into domain $D_a$ and then back into domain $D_b$, and use a reconstruction consistency loss $L^{CX}_{cc}$ between the image $X_b$ and the reconstructed image $X_{b-a-b}$ to further learn the parameters of the GAN.

Figure 7B:
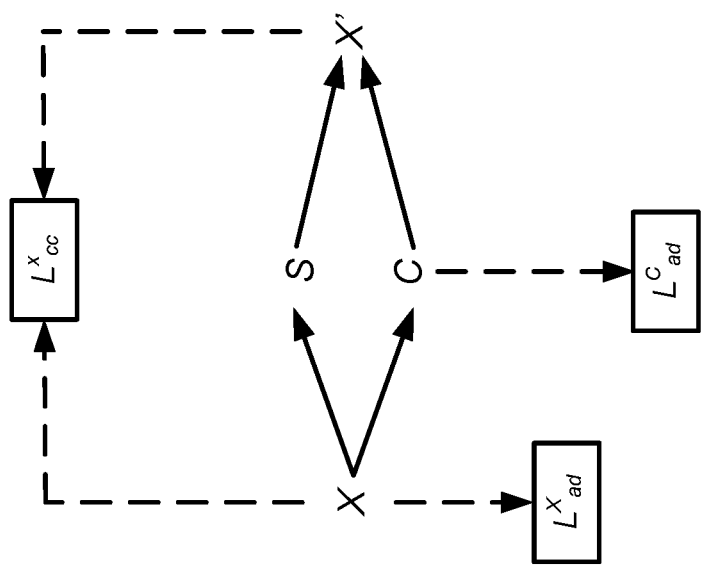
FIG. 7B is a diagram illustrating an example technique for training a neural network for extracting content and/or style features from images associated with a same modality domain in accordance with one or more embodiments described herein.

The cross-domain training of the GAN described above may be accompanied by image reconstruction training within each domain. FIG. 7B and part of FIG. 7A illustrate examples of such training operations utilizing reconstruction losses $L^X_{cc}$ (e.g., for cycle consistency) and $L^X_{ad}$ (e.g., for adversarial loss). It should be noted that the loss functions described herein may not be limited to cross-correlation losses. Euclidean distance losses or other suitable loss functions may also be used to minimize the dissimilarity between translated images. And once the GAN has been trained, the content feature encoder (e.g., $E^c$ shown in FIG. 5 or FIG. 6) of the GAN may be used to extract features from images (e.g., multimodal images) and determine a similarity or dissimilarity metric that may be used to facilitate the registration of the images.

Figure 8:
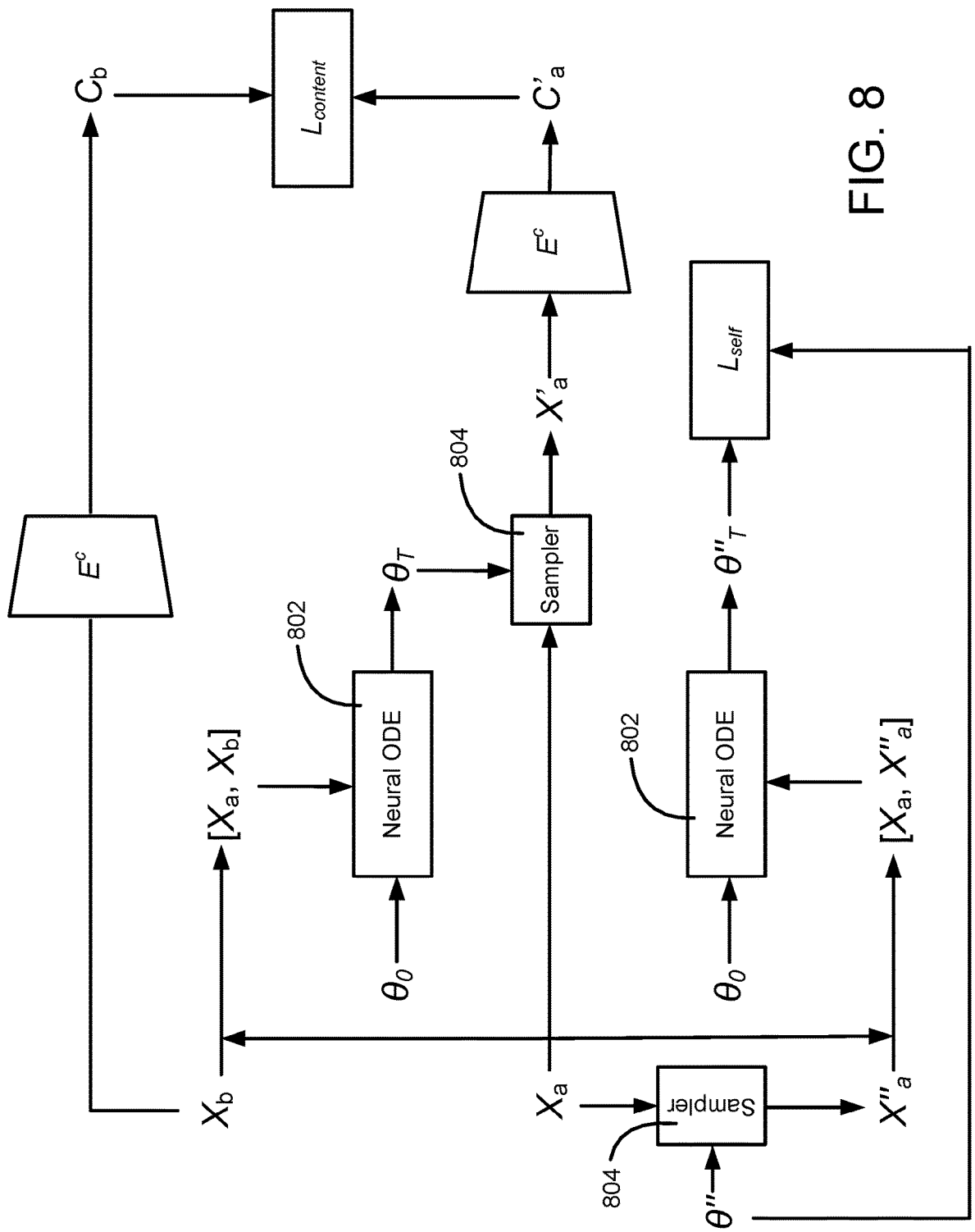
FIG. 8 is a diagram illustrating an example technique for training a neural ODE network to accomplish an image registration task using a pre-trained feature encoder in accordance with one or more embodiments described herein.

FIG. 8 shows an example technique of training a neural ODE network for image registration utilizing a pre-trained GAN (e.g., a pre-trained feature encoder of the GAN). As shown, the image registration task may involve two input images $X_a$ (e.g., a moving image) and $X_b$ (e.g., a fixed image). As part of the training and/or inference operations, the image $X_a$ may be resampled using a sampler 804 (e.g., the sampler 106 in FIG. 1 or 206 in FIG. 2) based on transformation parameter $\theta_T$ determined by a neural ODE network 802 to obtain a transformed image $X'_a$. A pre-trained content encoder $E^c$ (e.g., $E^c$ shown in FIG. 5 or FIG. 6) may be utilized to extract content features $C_b$ from the image $X_b$ and content features $C'_a$ from the resampled image $X'_a$ (e.g., the parameters or weights of the encoder $E^c$ may be pre-learned and fixed during the training of the neural ODE 802). A loss $L_{content}$ may be determined between the extracted content features $C'_a$ and $C_b$, and used to optimize the parameters of the neural ODE network 802. Since the encoder $E^c$ may be capable of extracting shared content features from both image $X'_a$ and image $X_b$ even if they belong to different modality domains (e.g., MRI and CT), the neural ODE network 802 may also learn to register images regardless of whether they are from the same modality domain or different modality domains.

In examples, the neural ODE 802 shown in FIG. 8 may be trained using one or more additional loss functions. For instance, during the training, a random perturbation may be applied to the transformation parameters $\theta$ to obtain perturbed parameters $\theta"$. The moving image $X_a$ may then be resampled based on the perturbed parameters $\theta"$ to derive a perturbed image $X"_a$. The perturbed image $X"_a$ and the original image $X_a$ may be provided to the neural ODE 802 for registration (e.g., to derive transformation parameters $\theta"_T$ based on the pair of images). Since the values of the perturbed parameters $\theta"$ are known, they may be used as ground truth to determine a loss $L_{self}$, which may be used to minimize the dissimilarity between the network predicted parameters $\theta"_T$ and the ground truth $\theta"$, and to optimize the parameters of the neural ODE 802.

Figure 9:
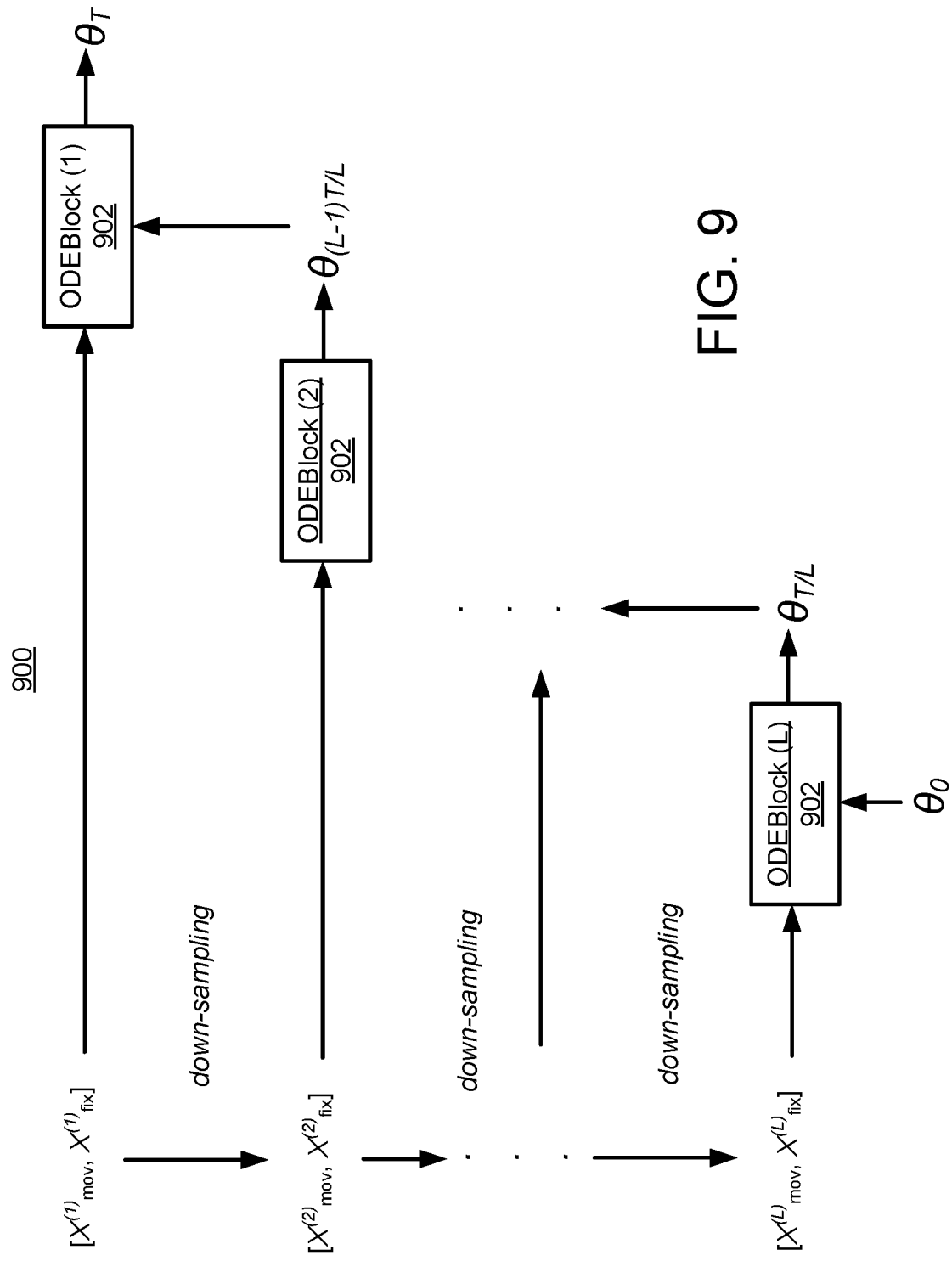
FIG. 9 is a diagram illustrating an example of a multi-scale neural ODE network in accordance with one or more embodiments described herein.

In examples, the neural ODE network described herein may be a multi-scale neural ODE network (e.g., the multiple scales may correspond to different sizes or resolutions of the images to be registered). FIG. 9 shows an example of such a neural ODE network 900. As shown, the neural ODE 900 may include multiple blocks or subsets 902, each of which may be configured to process images of a certain scale and each of which may be characterized by a respective step size (e.g., approximation step size) and/or a respective error tolerance level. Each scaled image $X^L$ may be obtained, for example, by down-sampling (e.g., ½ down-sampling) a previous image $X^{L-1}$. As such, after an input image has been down-sampled L times, transformation parameters predicted by the corresponding L-th ODE block or subnetwork may be $\theta_{T/L}$, reflecting a scale level of L. These parameters $\theta_{T/L}$ may then be used to initialize the image registration operation at scale level L−1 and the corresponding (L−1)-th ODE block or subnetwork. The same or similar operations may be performed iteratively (e.g., in a recursive manner) for other scale levels till level 1 (e.g., corresponding to the original image size) is reached. The output parameters $\theta_T$ of the neural ODE 900 may be then determined by integrating the respective outputs at all scale levels. Since the time cost for function evaluations may be much smaller at low resolutions, the multi-scale architecture of the neural ODE 900 may allow the network to accomplish an image registration task with a reduced number of function evaluations. The size of the searching space may also become smaller, leading to faster convergence and less sensitivity to local optimal.

Figure 10:
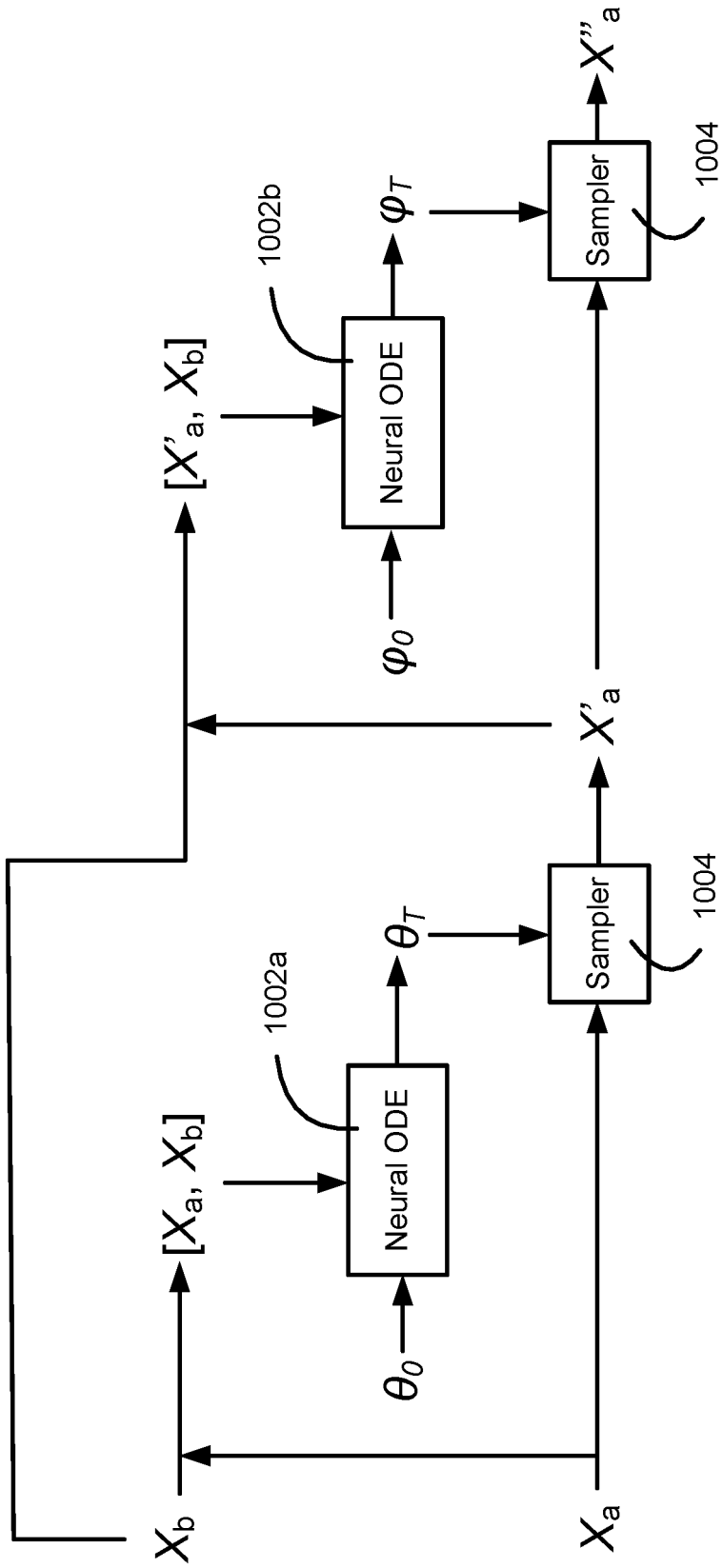
FIG. 10 is a diagram illustrating an example of an image registration framework using two cascaded neural ODE networks in accordance with one or more embodiments described herein.

The neural ODE network described herein may be suitable for predicting rigid, affine, and/or deformable transformation parameters. In examples, rigid transformation parameters may be estimated first and then used to estimate deformable transformation parameters. FIG. 10 shows such an example registration framework using two cascaded neural ODE networks 1002a and 1002b. The neural ODE 1002a may be configured to estimate rigid transformation parameter $\theta_T$ based on initial values $\theta_0$ of the parameters. The predicted rigid transformation parameter $\theta_T$ may then be used to initialize the neural ODE 1002b for predicting deformable transformation parameters $\varphi_T$ based on initial values $\varphi_0$ of the deformable transformation parameters and an image pair [$X'_a$, $X_b$] (e.g., $X'_a$ may be obtained based on $\theta_T$ using a sampler 1004 as described herein). The rigid transformation performed by the neural ODE 1002a may bring the moving image $X_a$ closer to the fixed image $X_b$, thus reducing the searching space for optimal deformable transformation parameters $\varphi_T$ and accelerating the registration process. It should be noted that the network structure shown in FIG. 10 is for illustration purposes and not meant to limit how transformation parameters may be determined. For instance, the neural ODE network described herein may be used to determine deformable transformation parameters (e.g., only deformable transformation parameters) without first determining rigid (or affine) transformation parameters (e.g., without using a cascading network as described herein).

Figure 11:
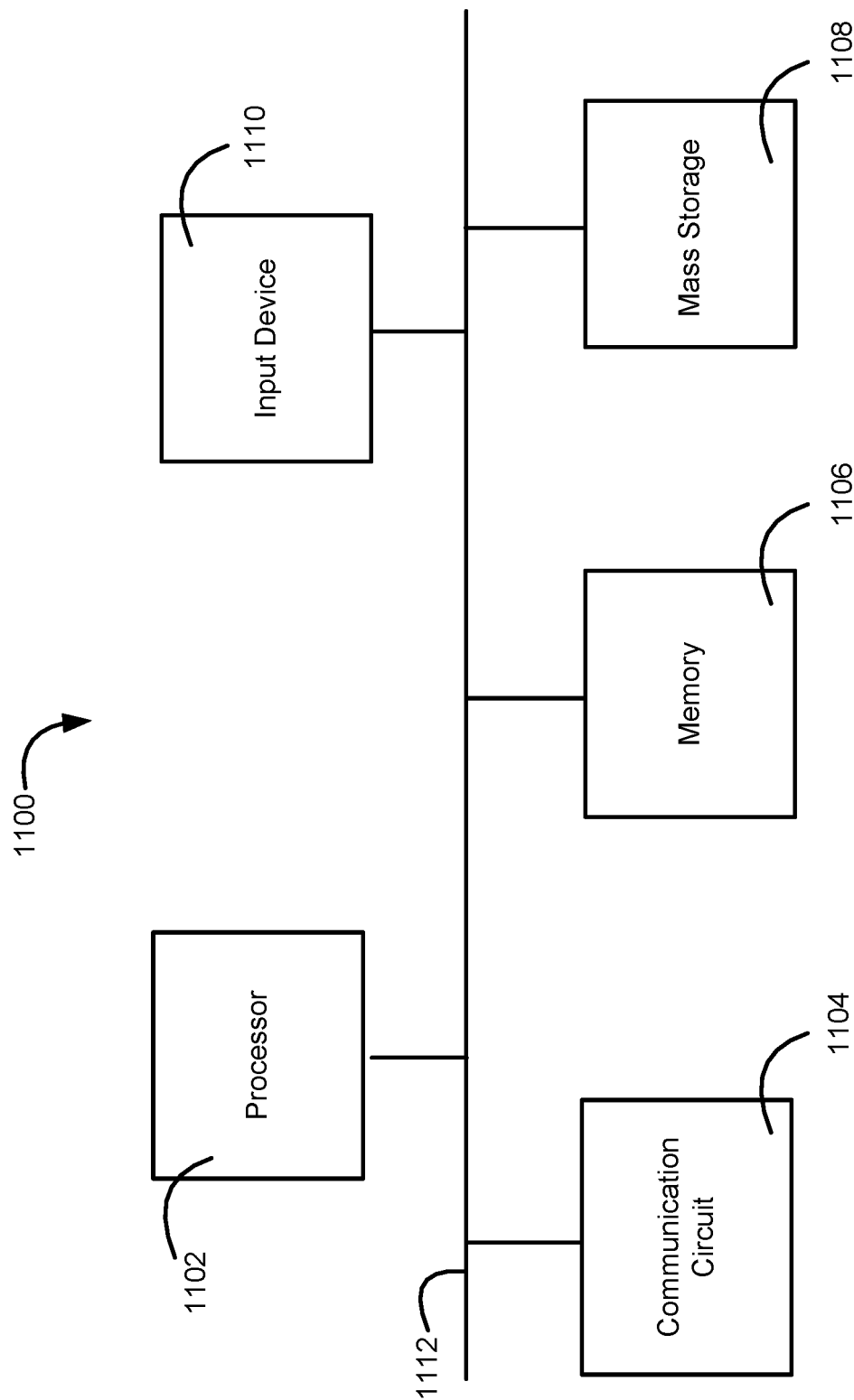
FIG. 11 is a block diagram illustrating an example apparatus that may be configured to accomplish an image registration task in accordance with one or more embodiments described herein.

The systems, methods, and/or instrumentalities described herein may be implemented using one or more processors, one or more storage devices, and/or other suitable accessory devices such as display devices, communication devices, input/output devices, etc. FIG. 11 is a block diagram illustrating an example apparatus 1100 that may be configured to perform image registration operations described herein. As shown, the apparatus 1100 may include a processor (e.g., one or more processors) 1102, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. The apparatus 1100 may further include a communication circuit 1104, a memory 1106, a mass storage device 1108, an input device 1110, and/or a communication link 1112 (e.g., a communication bus) over which the one or more components shown in the figure may exchange information.

The communication circuit 1104 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). The memory 1106 may include a storage medium (e.g., a non-transitory storage medium) configured to store machine-readable instructions that, when executed, cause the processor 1102 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. The mass storage device 1108 may include one or more magnetic disks such as one or more internal hard disks, one or more removable disks, one or more magneto-optical disks, one or more CD-ROM or DVD-ROM disks, etc., on which instructions and/or data may be stored to facilitate the operation of the processor 1102. The input device 1110 may include a keyboard, a mouse, a voice-controlled input device, a touch sensitive input device (e.g., a touch screen), and/or the like for receiving user inputs to the apparatus 1100.

It should be noted that the apparatus 1100 may operate as a standalone device or may be connected (e.g., networked or clustered) with other computation devices to perform the functions described herein. And even though only one instance of each component is shown in FIG. 11, a skilled person in the art will understand that the apparatus 1100 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method of image registration, the method comprising:
   obtaining a first image of an anatomical structure;
   obtaining a second image of the anatomical structure;
   determining a plurality of transformation parameters for registering the first image with the second image, wherein the plurality of transformation parameters is determined by at least:
   obtaining initial values of the plurality of transformation parameters;
   determining, through one or more iterations, respective updates for the plurality of transformation parameters using an artificial neural network (ANN), wherein each of the updates is determined based on a respective present state of the plurality of transformation parameters associated with each of the one or more iterations; and
   obtaining, utilizing an ordinary differential equation (ODE) solver, final values of the plurality of transformation parameters based on the respective updates determined by the ANN; and
   registering the first image with the second image using the final values of the plurality of transformation parameters, wherein:
   the ANN comprises a first sub-network and a second sub-network;
   the first sub-network comprises a first neural ODE solver characterized by a first step size or a first error tolerance level, the first sub-network configured to determine a first set of transformation parameters for registering the first image with the second image based on respective versions of the first image and the second image that are characterized by a first resolution; and
   the second sub-network comprises a second ODE solver characterized by a second step size that is different than the first step size or by a second error tolerance level that is different than the first error tolerance level, the second sub-network configured to determine a second set of transformation parameters for registering the first image with the second image based on the first set of transformation parameters and respective versions of the first image and the second image that are characterized by a second resolution that is different than the first resolution.

2. The method of claim 1, wherein obtaining the final values of the plurality of transformation parameters based on the respective updates determined by the ANN comprises integrating the respective updates determined by the ANN using the ODE solver.

3. The method of claim 2, wherein the final values of the plurality of transformation parameters are obtained based on an integral of the updates and the initial values of the plurality of transformation parameters.

4. The method of claim 1, wherein the ANN is trained using an adjoint sensitivity based method.

5. The method of claim 1, wherein the first image and the second image are associated with a same imaging modality.

6. The method of claim 1, wherein the first image is associated with a first imaging modality and the second image is associated with a second imaging modality that is different than the first imaging modality, wherein the method further comprises determining, using a generative adversarial network (GAN), one or more features shared by the first image and the second image, and wherein the first image is registered with the second image based on the one or more shared features.

7. The method of claim 6, wherein the first image is obtained via magnetic resonance imaging (MRI) and the second image is obtained via computed tomography (CT).

8. The method of claim 1, wherein the second sub-network is cascaded with the first sub-network.

9. The method of claim 1, wherein the plurality of transformation parameters for registering the first image with the second image comprises deformable transformation parameters, the first set of transformation parameters determined by the first sub-network comprises a set of rigid transformation parameters for registering the first image with the second image, and the second sub-network is configured to determine the deformable transformation parameters based on the set of rigid transformation parameters determined by the first sub-network.

10. A apparatus, comprising:
    one or more processors configured to:
    obtain a first image of an anatomical structure;
    obtain a second image of the anatomical structure;
    determine a plurality of transformation parameters for registering the first image with the second image, wherein one the one or more processors are configured to determine the plurality of transformation parameters by at least:
    obtaining initial values of the plurality of transformation parameters;
    determining, through one or more iterations, respective updates for the plurality of transformation parameters using an artificial neural network (ANN), wherein each of the updates is determined based on a respective present state of the plurality of transformation parameters associated with each of the one or more iterations; and
    obtaining, utilizing an ordinary differential equation (ODE) solver, final values of the plurality of transformation parameters based on the respective updates determined by the ANN; and
    register the first image with the second image using the final values of the plurality of transformation parameters, wherein:
    the ANN comprises a first sub-network and a second sub-network;
    the first sub-network comprises a first neural ODE solver characterized by a first step size or a first error tolerance level, the first sub-network configured to determine a first set of transformation parameters for registering the first image with the second image based on respective versions of the first image and the second image that are characterized by a first resolution; and
    the second sub-network comprises a second ODE solver characterized by a second step size that is different than the first step size or by a second error tolerance level that is different than the first error tolerance level, the second sub-network configured to determine a second set of transformation parameters for registering the first image with the second image based on the first set of transformation parameters and respective versions of the first image and the second image that are characterized by a second resolution that is different than the first resolution.

11. The apparatus of claim 10, wherein the one or more processors being configured to obtain the final values of the plurality of transformation parameters based on the respective updates determined by the ANN comprises the one or more processors being configured to integrate the respective updates determined by the ANN using the ODE solver.

12. The apparatus of claim 11, wherein the final values of the plurality of transformation parameters are obtained based on an integral of the updates and the initial values of the plurality of transformation parameters.

13. The apparatus of claim 10, wherein the ANN is trained using an adjoint sensitivity based method.

14. The apparatus of claim 10, wherein the first image and the second image are associated with a same imaging modality.

15. The apparatus of claim 10, wherein the first image is associated with a first imaging modality and the second image is associated with a second imaging modality that is different than the first imaging modality, and wherein the one or more processors are further configured to determine, using a generative adversarial network (GAN), one or more features shared by the first image and the second image, and to register the first image with the second image based on the one or more shared features.

16. The apparatus of claim 15, wherein the first image is obtained via magnetic resonance imaging (MRI) and the second image is obtained via computed tomography (CT).

17. The apparatus of claim 10, wherein the second sub-network is cascaded with the first sub-network.

18. The apparatus of claim 10, wherein the plurality of transformation parameters for registering the first image with the second image comprises deformable transformation parameters, the first set of transformation parameters determined by the first sub-network comprises a set of rigid transformation parameters for registering the first image with the second image, and the second sub-network is configured to determine the deformable transformation parameters based on the set of rigid transformation parameters determined by the first sub-network.

* * * * *